Feb. 7, 1967     C. W. LEGUILLON     3,302,678
CONCEALMENT MEANS FOR KEYS
Filed June 30, 1965
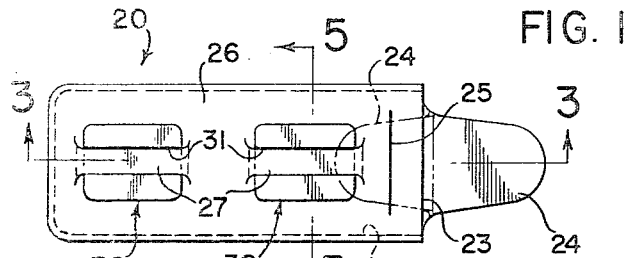
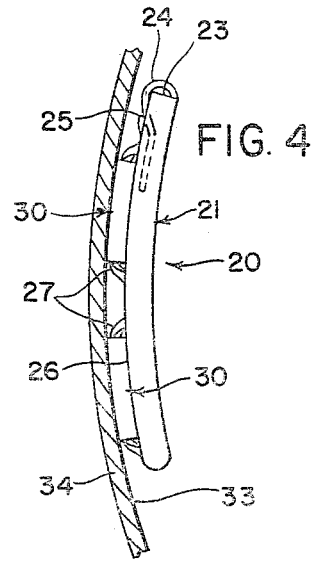
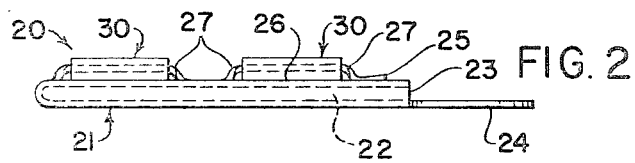
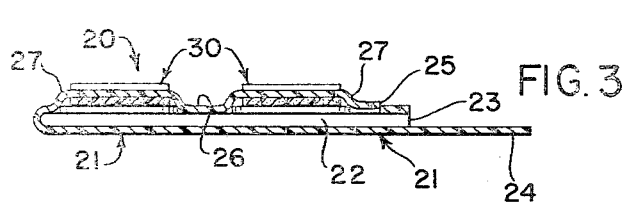
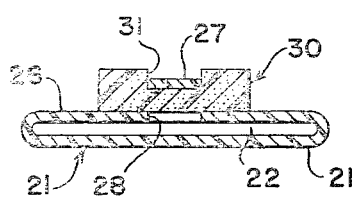
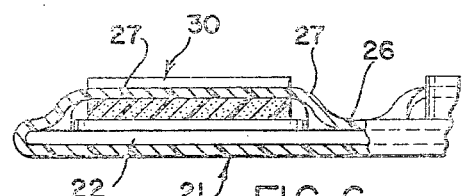
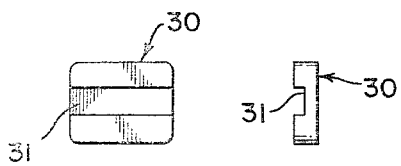
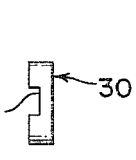
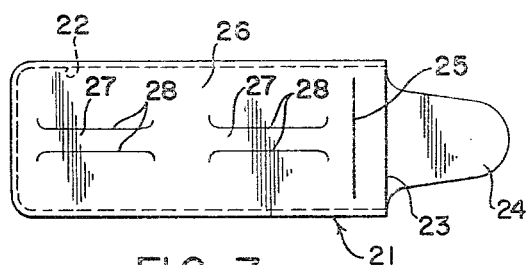
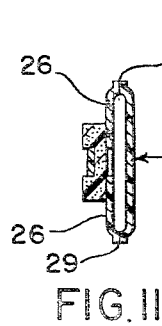
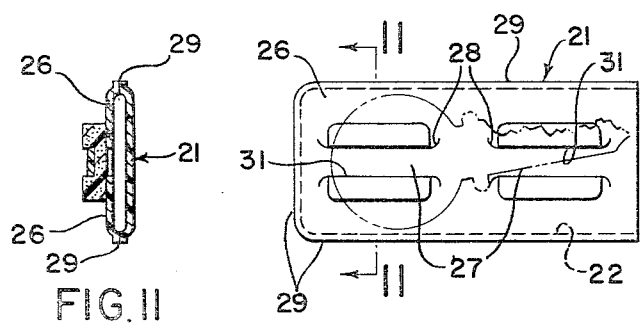
INVENTOR.
CHARLES W. LEGUILLON
BY
*Willis F. Avery*
ATTORNEY United States Patent Office 3,302,678
Patented Feb. 7, 1967

3,302,678
CONCEALMENT MEANS FOR KEYS
Charles W. Leguillon, 211 Overwood Road,
Akron, Ohio 44313
Filed June 30, 1965, Ser. No. 468,397
10 Claims. (Cl. 150—40)

This invention relates to means for concealing a key and more particularly to means for encasing a key, such as an automobile key, door key and the like, in an envelope provided with replaceable magnetic means capable of holding the envelope with encased key to a nonplanar surface of a paramagnetic body.

It has heretofore been proposed to provide a key holder magnetically held to a metal surface of some part of an automobile, but such holders have generally proven to be unsatisfactory, primarily because of the fact that the accessible out of sight metal surfaces of the automobile are not flat planes and hence the magnet portion of the holder does not contact the surface of the metal over a sufficient area to retain the key holder in place during the vertical and horizontal oscillations and vibrations of all parts of the automobile due to rough conditions of the road surface, especially upon vigorous jarring of the automobile in passing over bumps and holes in the roadway, as well as the vibrations caused by the closing of a door with a bang, which is the normal way an automobile hood, trunk, dashboard and entrance doors are closed.

It is an object of this invention to provide a concealment means for keys which will not become detached, when applied to a nonplanar surface, that is, a surface area made up at least in part of curved surfaces, and/or surfaces in different planes, of the supporting paramagnetic metal portions of a house or automobile, upon the jarring and/or vibration of the latter, as when a house door or one of the many automobile doors is slammed closed.

This object is attained by the utilization of a key envelope having a flexible distortionable side wall portion to an outer surface of which the magnetic members are affixed in such manner as to permit the magnetic members to tilt in any direction without necessarily a corresponding change in position of the flexible wall member, although the wall member is flexible and may follow the movement of the magnet as it seats itself on the paramagnetic surface support. For certain uses, as on multicurved paramagnetic surfaces, it may be desirable to have the magnetic members composed of a flexible base which is distortionable to permit it to conform more closely to the surface of the supporting paramagnetic metal.

Other objects and advantages of this invention will become apparent during the course of the following description.

In the accompanying drawings:

FIG. 1 is a plan view of one form of my invention;
FIG. 2 is a side elevation view of FIG. 1;
FIG. 3 is a cross section view of FIG. 1 on line 3—3 of FIG. 1;
FIG. 4 is a view in elevation showing the concealment means applied to a nonplanar surface of a paramagnetic support;
FIG. 5 is an enlarged cross sectional view taken on line 5—5 of FIG. 1;
FIG. 6 is a fragmentary enlarged cross section view taken on line 3—3 of FIG. 1;
FIG. 7 is a plan view of the envelope showing the slits cut in one side wall of the envelope to form the straps which loosely hold the magnetic members thereto;
FIG. 8 is a plan view of the magnetic member;
FIG. 9 is a side view of the magnetic member;
FIG. 10 is a plan view of the assembled container made of two strips of plastic, heat-sealed at the edges.
FIG. 11 is a cross section view taken on line 11—11 of FIG. 10.

Referring to the drawing, wherein is shown a preferred embodiment of this invention for purposes of illustration, the concealment means 20 comprises a flexible distortionable envelope 21, which may be made of any suitable material, including extruded, molded or dipped flexible plastics, such as rubber, vinyl plastics, polyethylene, polystyrene, polyurethane and like plastics, which plastics have been found to give excellent service from the long-life standpoint, although it is to be understood the material of the envelope 21 is not limited to the above named plastics, but may be made of other flexible, distortionable materials, such as leather.

The envelope 21, which may be made by molding, dipping, extruding or otherwise, has a central space 22 which may be open at only one end, or both ends, for the reception of the key. Preferably, the envelope 21 is open at only one end 23, and has a protruding flap 24 which may be tucked into the slot 25 to enclose the key at the open end 23, as will be hereinafter described. The envelope 21 is preferably thin walled so as to be readily distortionable, flexible and elastic to return to its original form when stresses on it are released.

One of the wide flat sides 26 of the envelope 21 is provided with loop straps 27 under which loop straps 27 the magnetic members 30 are removably placed.

The magnetic member 30 is preferably a rectangular block having a centrally disposed channel 31 in one of the surfaces thereof. The channel 31 is of a width of the straps 27 and of greater depth than the thickness of the strap 27, so as to have the strap 27 free of contact with the paramagnetic support when in use.

Preferably the straps 27 are integral with the side wall 26 and are formed by slits 28, shown more clearly in FIG. 7. The slits 25 may be cut by the same die at the same time as the slits 28.

In FIG. 4, the key container 20 is shown in contact with the surface 33 a paramagnetic member 34, which is normally an iron or steel or nickle part of an automobile, as for example the underside of a fender.

In assembling the key concealment means 20, the envelope 21 is first made by dipping, extruding, etc., of a flexible plastic to form an envelope 21 such as is shown in the several views of the drawing. Then the slits 28 in the side wall 26 of the envelope 21 are made by cutting, preferably by a suitable die. The slit 25 may also be made at the same time and place. The magnetic members 30 are then put in place on the envelope 21, the magnets 30 being placed between the straps 27 and the surface 26 of the envelope 21 by stretching the straps 27 and forcing the magnet 30 under the strap 27 until the strap 27 coincides with the channel 31, whereupon the strap 27 will enter into the channel 31 and hold the magnet 30 in place.

When the key container 20 is in concealed position, as in FIG. 4, it will be noted that the magnet 30 is free to tilt in any direction under stress occasioned by the magnet 30 contacting the non-planar surface 33 of the paramagnetic metal 34 of the support for the key, and thus to form a strong magnetic contact with the support.

As shown in FIGS. 10 and 11, the envelope 21 is made from two sheets of flexible material. In this form, suitable dies are used to cut each of the side walls to proper size to form the envelope 21, and to cut the slits 28 in one of the side walls. In this embodiment, the envelope 21 is formed by utilizing the two side wall members, one with the slots 28 and the other a backing side wall of equal size, the two side walls being heat sealed, or otherwise attached to each other at edges 29, as shown in FIG. 10.

The shape of the magnetic member 30 with the slot 31 imparts to it the greater magnetic force of a horseshoe magnet. Moreover, as is well known, the magnetic holding force is increased by increased surface contact of the magnet with surface of the paramagnetic support. The relative loose mounting of the magnetic member 30 on the envelope 21 by slipping them under the straps 27 to a position in which the strap 27 is contained within the channel 31 permits the magnetic member 30 to tilt in all directions necessary to bring the outer surface of the magnetic member 30 into closer surface contact with the surface 33 of the nonplanar paramagnetic support 34, and hence to give to the magnetic member 30 a greater holding force to the paramagnetic surface 33.

It is to be understood that the embodiments herein described and illustrated are examples of the invention of this application and that various changes in materials and in size, shape and relative arrangement of parts may be included in the invention of this application without departing from the spirit of this invention or the scope of the following claims:

What I claim is:

1. In a container for a key capable of being magnetically held firmly to a nonplanar surface of a paramagnetic metal support, in combination, a distortionable walled envelope having a pocket therein suitable for containing a key, and a magnetic element removably attached to an outer side distortionable wall of said envelope so as to be capable of tilting in any direction independently of the said outer side distortionable wall, whereby the removably attached magnetic element may tilt on contact with the paramagnetic metal support to produce a larger area of contact therewith.

2. In a container for a key capable of being magnetically held firmly to a nonplanar surface of a paramagnetic metal support, in combination, a distortionable walled envelope having a pocket therein suitable for containing a key, and a magnetic element U-shaped in cross section by a groove in one surface thereof extending the length of the magnetic element, said magnetic element being secured to a side wall of the distortionable walled envelope by a strap integral with the side wall and lying within the said groove in the magnetic element, whereby said magnetic element may tilt on contact with the paramagnetic metal support to produce a larger area of contact therewith.

3. In a container for keys capable of being magnetically held firmly to a nonplanar surface of a paramagnetic support, in combination, a distortionable walled envelope having a pocket therein suitable for containing a key, a magnetic element having a groove centrally disposed on one surface thereof and extending the length thereof to form a U-shape element having two parallelly disposed surfaces for magnetic contact with a paramagnetic metal support, a side wall of said envelope comprising a strap forming an integral part thereof, said magnetic element being tiltably held to the side wall by said strap disposed within the groove of said magnetic element, the said two parallelly disposed surfaces of the U-shape magnetic element being free to contact a paramagnetic metal support, whereby the distortionable character of said side wall and tilting support of the magnetic element to said side wall enables the magnetic element to contact a nonplanar paramagnetic metal support at a greater area of contact.

4. In a container for keys capable of being magnetically held firmly to a non-planer surface of a paramagnetic support, in combination, a distortionable walled envelope having a pocket therein suitable for containing a key, a magnetic element having a plane surface and a groove centrally in and extending the length of said plane surface to form two distinct parallelly disposed surfaces for magnetic contact with a paramagnetic metal support, one side wall of said envelope having a loop strap integral therewith, said magnetic element being tiltably held to the side wall by said strap disposed within the grove of said magnetic element, the said two parallelly disposed surfaces of the U-shaped magnetic element being free to contact a paramagnetic metal support, whereby the distortionable character of said side wall and tilting support of the magnetic element to said side wall enables the magnetic element to contact a nonplanar paramagnetic metal support at a greater area of contact.

5. In a container for a key capable of being magnetically held firmly to a nonplanar surface of a paramagnetic metal support, in combination, a distortionable walled envelope having a pocket therein suitable for containing a key, said envelope having one of its side walls provided with two centrally disposed and separated parallel slits to form a loop strap integral with the said side wall, a magnetic element having a plane surface and a groove centrally in and extending the length of said plane surface to form two distinct parallelly disposed surfaces for magnetic contact with a paramagnetic metal support, said magnetic element being positioned on the said side wall with the loop strap positioned within the groove to tiltably hold the magnetic element to the said side wall, whereby the distortionable character of said side wall and tilting support of the magnetic element to said side wall enables the magnetic element to contact a nonplanar paramagnetic metal support at a greater area of contact.

6. In a container for keys capable of being magnetically held firmly to a non-planar surface of a paramagnetic support, in combination, an envelope comprising two distortionable side walls spaced from each other sufficiently to hold a key between them and joined to each other at the margins except for an opening for the entrance and exit of a key, said envelope having one of its side walls provided with two centrally disposed and separated parallel slits to form a loop strap integral with the said side wall, a magnetic element tiltably secured to the outer surface of said side wall by the said loop strap, whereby the distortionable character of said side wall and tilting support of the magnetic element to said side wall enables the magnetic element to contact a non-planar paramagnetic metal support at a greater area of contact.

7. In a container for a key capable of being magnetically held firmly to a nonplanar surface of a paramagnetic metal support, in combination, an envelope comprising two distortionable side walls spaced from each other sufficiently to hold a key between them and joined to each other at the margins except for an opening for the entrance and exit of a key, two plastic magnetic blocks removably secured to an outer surface of one of said distortionable side walls and spaced from each other so as to leave the wall between the plastic magnetic blocks free to distort under pressure, each magnetic block having a groove centrally disposed on one side thereof and extending the length thereof to form a U-shaped element having two parallelly disposed surfaces for magnetic contact with a paramagnetic support, one of the side walls of the envelope having two loop straps, one for each magnetic block, integral therewith, the magnetic blocks being removably mounted so that a loop strap is within the groove in the magnetic block, whereby the distortionable character of said side wall and tilting support of the magnetic element to said side wall enables the magnetic element to contact a nonplanar paramagnetic metal support at a greater area of contact.

8. The container defined in claim 7 in which the grooves in the two magnetic blocks are in substantial alignment.

9. The container defined in claim 7 in which the loop straps are formed by cutting slits in one side wall of the container and stretching the portion of the side wall outwardly sufficiently to receive the magnetic blocks with the straps in the grooves, whereby a mounting of the magnetic blocks is achieved that permits removal of the said blocks when desired.

10. The container defined in claim 7 in which the said envelope is formed by two separate pieces of flexible material attached to each other at all edges except for a space large enough for the entrance and exit of a key into and out of the said envelope.

References Cited by the Examiner

UNITED STATES PATENTS

| | | | |
|---|---|---|---|
| 3,007,568 | 11/1961 | Kurland | 150—40 X |
| 3,212,546 | 10/1965 | Lind | 150—40 |
| 3,229,844 | 1/1966 | Simon | 220—18 |
| 3,262,479 | 7/1966 | Lequillon | 150—40 |

FRANKLIN T. GARRETT, *Primary Examiner*